Patented May 27, 1930

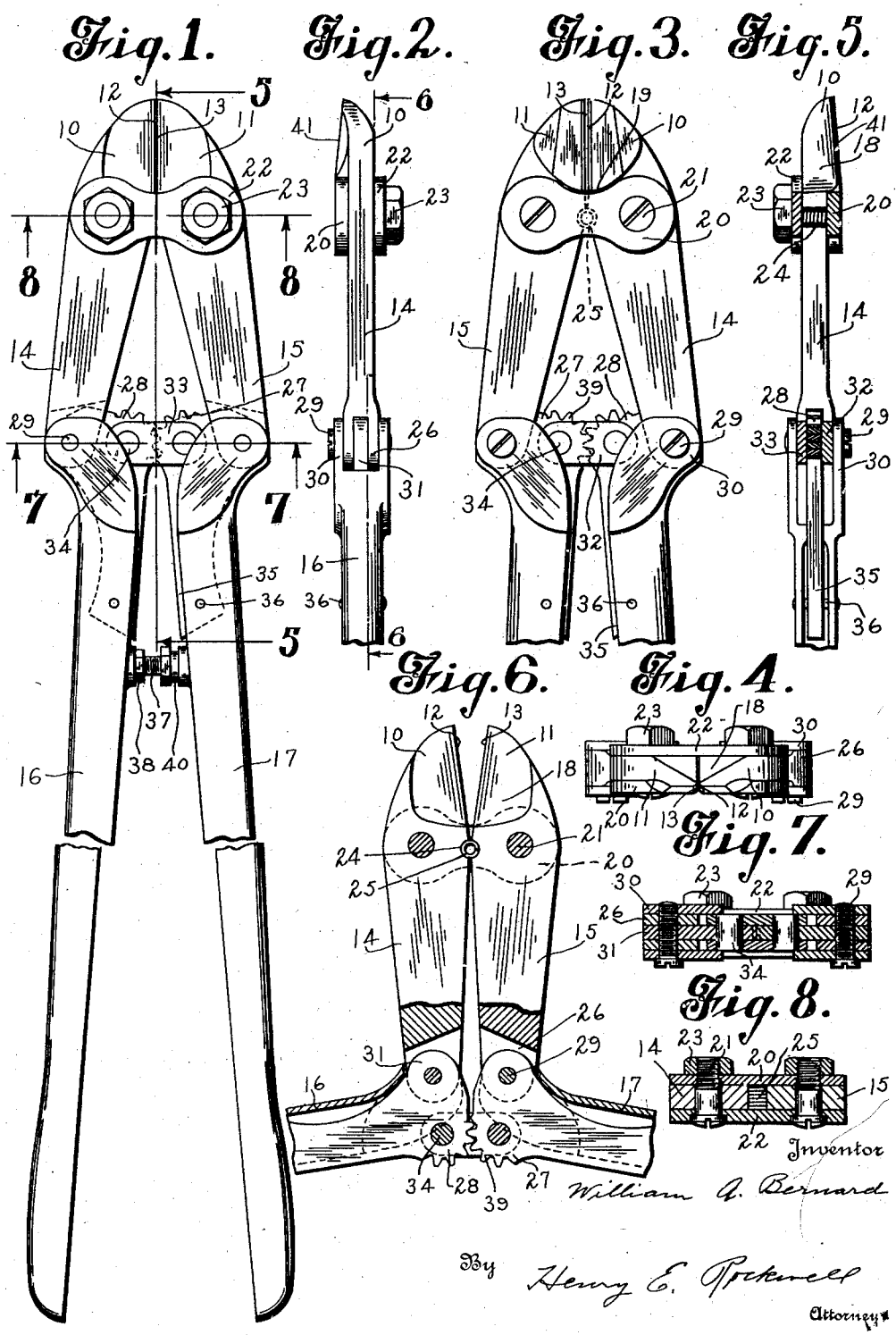

1,760,627

UNITED STATES PATENT OFFICE

WILLIAM A. BERNARD, OF NEW HAVEN, CONNECTICUT, ASSIGNOR TO THE WILLIAM SCHOLLHORN COMPANY, OF NEW HAVEN, CONNECTICUT

HAND TOOL

Application filed August 4, 1926. Serial No. 127,159.

This invention relates to hand tools, and more especially to a type of hand tool where a powerful leverage is required to operate the jaws thereof.

One form of hand tool requiring this advantage is shown in the drawings, and is of the type generally known as bolt cutters or clippers.

The principal object of this invention is to improve the general construction of devices of the type to which this invention relates.

Another object of this invention is to provide a hand tool of the bolt clipper type of generally improved structure which will be economical to manufacture and efficient in use.

Still another object of this invention is to provide a hand tool wherein a powerful leverage is produced by simple and effective means to operate the jaws thereof.

A still further object of this invention is to provide efficiently operating means for supporting and centering the operable parts of such a hand tool, especially when the parts are pivoted non-coincidently.

To these and other ends the invention consists in the novel features and combination of parts to be hereinafter described and claimed.

In the accompanying drawings:

Fig. 1 is a top plan view of a hand tool embodying the features of this invention;

Fig. 2 is a left hand side view of the tool shown in Fig. 1;

Fig. 3 is a bottom plan view of a portion of the same;

Fig. 4 is a front end view of the same;

Fig. 5 is a longitudinal section on line 5—5 of Fig. 1;

Fig. 6 is a section on line 6—6 of Fig. 2, certain parts being broken away for the sake of clearance, the parts of the tool being illustrated in the positions assumed thereby when the jaws are in open position;

Fig. 7 is a transverse section on line 7—7 of Fig. 1; and

Fig. 8 is a section on line 8—8 of Fig. 1.

The hand tool which I have selected for illustrating the features of this invention is of the type generally known as bolt clippers, wherein a powerful leverage is required to operate upon the jaws between which a bolt or the like may be disposed and acted upon to sever it. To reduce strains tending to distort the bolt to be cut, it is desirable to provide the cutting tool with means whereby the cutting edges of the jaws will equally enter the bolt on both sides thereof. It is also desirable that the tool be of such form that a bolt or screw end may be severed flush with the surface of the article from which it protrudes.

The bolt clipper illustrated is capable of the above operations, and comprises in general cooperating jaws 10 and 11 having abutting cutting edges 12 and 13 and rearwardly extending shank portions 14 and 15 respectively. The shank portions 14 and 15 are operatively connected to handle levers 16 and 17 respectively. The jaws 10 and 11 are slightly angularly inclined as at 41 from the longitudinal axis of the tool at the cutting edges 12 and 13 which in this instance are disposed adjacent the under surface of these jaws and extend a short distance rearwardly from the front end thereof. The top surface of each of the jaws at this point is cupped downwardly, as at 18, and merges into the cutting edges. Shoulders 19 are formed at the rearwardly cutting edges by forming the shank portions 14 and 15 of thinner metal than that of the jaws 10 and 11. A strap 20 extends from one jaw to the other rearwardly of the shoulder 19, and is substantially of the same dimension and thickness as the dimension of the height of said shoulder. Screws 21 pass through the ends of the strap 20, and through each shank portion, being threaded within openings of another strap 22 which extends across and between the jaws upon the top surface thereof. Lock nuts 23 threadedly engage the protruding ends of the screws 21 to prevent the loosening thereof. By the above described means the jaws are pivotally connected together and to the straps, and may rock or rotate relatively to each other when the outer ends of the shanks 14 and 15 are moved toward or away from each other. A laterally extending recess 24 is provided in each jaw adjacent the shoulders 19. These recesses coincide, and a coil spring 25 is inserted therein about which the jaws rock or rotate in an easy and smooth manner.

The rear ends of the shank portions 14 and 15 are bifurcated as at 26 to straddle transverse extensions 31 of a pair of intermeshing gear segments 27 and 28.

The handle levers 16 and 17 are pivoted to the rear ends of the shank portions by pivot pins 29 which pass through the bifurcated end 30 of each handle, the bifurcated end 26 of each shank portion, and the extension 31 of each gear segment. A pair of straps 32 and 33 connect the gear segments 27 and 28 together, being disposed upon different sides thereof and pivoted to the segments by pivot pins 34. The teeth 39 of the gear segments 27 and 28 are arranged on an arc which is concentric with the center of the pivot pin 34 and a rearwardly directed portion 35 of each gear segment is secured to the adjacent hand lever by a rivet or the like 36. A movement limiting stop is provided comprising the adjusting screw 37 which threads into one of the handle levers, being adapted to be locked against loosening by the lock nut 38. The head of the screw 37 is adapted to abut a boss 40 located opposite the same upon the other handle lever. In this instance the boss 40 is of rubber thereby providing a cushion-effect to prevent the noisy operation thereof, and which is cemented or otherwise secured to the handle lever. By adjusting the screw 37 the amount of contact between the cutting edges 12 and 13 may be regulated so as to offset the wear thereof due to sharpening thereof. When the jaws are closed as in Fig. 1 the cutting edges 12 and 13 are substantially in abutting relation, the shank portions 14 and 15 are spread apart and the handle levers are closely adjacent each other, the limiting stop parts being in abutting relation to limit further closing of the jaws. At this time the pivot pins 29 and 34 are in alignment transversely of the tool, the pins 34 being disposed nearer to the longitudinal axis of the tool and the pins 29 being farther away.

As the handle levers 16 and 17 are spread apart to open the jaws 10 and 11, the meshing teeth 39 of the gear segments 27 and 28 insure that each pivot pin 29 will rotate about the adjacent pivot pin 34 at the same speed and cause the handle levers to move in unison. At the same time the pivot pin 29 will be drawn toward the longitudinal axis of the tool whereby the shanks 14 and 15 will be moved toward each other, and by so doing will rock or rotate the jaws 10 and 11 about the pivot point at the spring 25, which movement will open the jaws 10 and 11 and expand the cutting edges 12 and 13.

The compound lever arrangement above described, insures the provision of a very powerful leverage, especially as the jaws approach the closed position, at which time the movement thereof will be relatively slow due to the arrangement of the parts adjacent the pivot pins 29 and 34.

The provision of the straps 20 and 22 instead of a single pivot pin between the jaws 10 and 11 insures the continued use of the tool without danger of breakage or delay in repairing the same, this construction having been found to be one of great strength. Such a construction also provides for economical replacement of parts in the exceptional cases when breakage does occur, it being merely required to replace one or both of the straps instead of possibly a new pair of jaws, as would be required in the case of pivoted together jaws as noted above. It will be apparent that without the provision of the meshing teeth 39 of the gear segments 27 and 28 or an equivalent mechanical structure the interconnected parts of this tool, for instance jaw 11, shank portion 15 and handle lever 17 will have a tendency toward longitudinal movement relatively to the other interconnected parts as jaw 10, shank portion 14 and handle lever 16, and that, though the tool would operate to sever a bolt or the like, the action thereof would not be efficient. The eccentric action of the meshing teeth 39 maintains the two sets of levers or other parts in a symmetrical relation in respect to the longitudinal axis of the tool at all positions of the parts during the operation thereof; thus the cutting edges 12 and 13 will each move in unison and equally toward each other to engage opposite sides of the bolt or the like to be cut, each uniformly cutting into the same toward the center thereof, and thereby avoiding twisting strains thereon tending to distort the remainder of the bolt.

Inasmuch as the gear segments 27 and 28 are secured to the handle levers by both the pivot pins 29 and the rivets 36, no movement of one relative to the other is possible, and therefore the gear teeth of the segments could obviously be formed directly upon the handle levers, and the straps 32 and 33 could then be pivoted directly to the handle in the same relative position as above described.

While I have shown and described a preferred embodiment of my invention, it will be understood that it is not to be limited to all the details shown but is capable of modification and variation within the spirit of the invention and within the scope of the appended claims.

What I claim is:—

1. In a hand tool, a pair of jaws rockable about a common center, a pair of strap members pivotally secured to said jaws and extending across the common center, shank portions having bifurcated ends extending rearwardly from said jaws and diverging therefrom when said jaws are in closed position, a handle lever bifurcated at one end pivotally connected to a bifurcated ends of said shank portions, gear segments secured to said handle members at the bifurcated ends thereof, a pair of strap members pivotally secured to said gear segments by pivot pins, said last mentioned strap members and pivot pins being retained in position by said bifurcated handle members.

2. In a hand tool, a pair of jaws rockable about a common center, each of said jaws having a rearwardly directed shank portion, each of said shank portions being bifurcated at the inner end thereof, a U-shaped handle member pivoted at its inner end to each jaw, a gear segment member disposed within the U-shape of said handle members and secured thereto, a portion of each of said gear members being disposed within the bifurcated portion of said jaw shank portions, and a pivot pin passing through the end of each of said handle members, said jaw shanks and said gear segment members, and connecting means between said gear segments, pivotally secured to each, to retain the teeth thereof in meshed relation.

3. In a hand tool, a pair of jaws rockable about a common center, each of said jaws having a rearwardly directed shank portion, each of said shank portions being bifurcated at the inner end thereof, a U-shaped handle member embracing the bifurcated end of each shank portion and pivoted at its end to each jaw, a gear segment member disposed within the U-shape of said handle members and secured thereto, a portion of each of said gear members being disposed within the bifurcated portion of said jaw shank portions which is embraced by said handle members, said gear segment members being disposed whereby the teeth thereof will mesh, and a pivot pin passing through each of said handle members, said shank portions and said gear segments at the adjacent portions thereof to pivotally secure said parts together.

4. In a hand tool, a pair of jaws rockable about a common center, a pair of strap members pivotally secured to said jaws and extending across the common center, shank portions having bifurcated ends extending rearwardly from said jaws and diverging therefrom when said jaws are in closed position, a handle lever bifurcated at one end pivotally connected to the bifurcated ends of said shank portions, gear segments secured to said handle members between the bifurcated ends thereof and extending between the bifurcated ends of said shank portions, common pivoting means to connect each of said shank portions, said handle levers and said gear segments together, and a pair of strap members pivotally secured to said gear segments by pivot pins to retain the teeth of said gear segments in meshed relation.

In witness whereof, I have hereunto set my hand this 26th day of July, 1926.

WILLIAM A. BERNARD.